United States Patent [19]

Yamashita

[11] Patent Number: 4,788,613
[45] Date of Patent: Nov. 29, 1988

[54] MAGNETIC HEAD HAVING COIL BOBBIN FOR MOUNTING PRINTED CIRCUIT BOARD

[75] Inventor: Akihiko Yamashita, Nagaoka, Japan

[73] Assignee: Alps Electric Co., Ltd., Japan

[21] Appl. No.: 70,106

[22] Filed: Jul. 6, 1987

[30] Foreign Application Priority Data

Jan. 30, 1986 [JP] Japan .............................. 61-12440[U]

[51] Int. Cl.[4] .................... G11B 5/17; G11B 5/127; H01F 27/30
[52] U.S. Cl. .................................... 360/123; 336/105; 336/192; 336/198; 360/125
[58] Field of Search ................ 336/198, 208, 200, 65, 336/192, 105, 107; 361/398; 360/123, 125, 128, 110, 104

[56] References Cited

U.S. PATENT DOCUMENTS

| | | | |
|---|---|---|---|
| 3,281,744 | 10/1966 | Melanson | 336/198 |
| 3,990,030 | 11/1976 | Chamberlin | 336/65 |
| 4,103,268 | 7/1978 | Anders et al. | 336/208 |
| 4,156,222 | 5/1979 | Rossman et al. | 336/198 X |
| 4,309,732 | 1/1982 | Kronfeld et al. | 360/104 |
| 4,432,027 | 2/1984 | Higuchi | 360/104 |
| 4,484,170 | 11/1984 | Wirth et al. | 336/65 |
| 4,520,555 | 6/1985 | Gui et al. | 360/104 |

FOREIGN PATENT DOCUMENTS

| | | | |
|---|---|---|---|
| 137632 | 4/1947 | Australia | 336/198 |
| 22829 | 2/1982 | Japan | 336/192 |
| 1339151 | 11/1973 | United Kingdom | 336/198 |

OTHER PUBLICATIONS

IBM Technical Disclosure Bulletin, M. Lovah, "Twin Bobbin Moulding for CRT Convergence Unit", vol. 21 No. 5, Oct. 1978, pp. 2032, 336-208.

Primary Examiner—Thomas J. Kozma
Attorney, Agent, or Firm—Guy W. Shoup; Paul J. Winters

[57] ABSTRACT

A coil bobbin for a magnetic head in which a recording and reproducing coil bobbin and an erasing coil bobbin each having a hole made therein for inserting a core are formed into an integral structure by being coupled at one end portions thereof through a flange with holes made therein for inserting cores. Terminal pins are provided on the flange, to which the coil winding ends are connected, and a flexible printed circuit board is connected to the coil windings by placing terminal pin insertion holes formed therein over the terminal pins on the flange.

3 Claims, 3 Drawing Sheets

MAGNETIC HEAD HAVING COIL BOBBIN FOR MOUNTING PRINTED CIRCUIT BOARD

This is a continuation-in-part application from application Ser. No. 942,518 filed 12/16/86, now abandoned.

BACKGROUND OF THE INVENTION

1. Field of the Invention

The present invention relates to a coil bobbin for a magnetic head and more particularly to a coil bobbin for a magnetic head for use in a floppy disk apparatus or the like.

2. Description of the Prior Art

In the past, as the coil bobbin for a magnetic head of this kind, separate coil bobbins were used for the recording and reproducing purpose and for the erasing purpose and it was a practice that these separate coil bobbins were each wound by a coil and then these bobbins were put on their respective recording and reproducing core and erasing core.

In the prior art coil bobbin for a magnetic head, since separate coil bobbins were used for the recording and reproducing purpose and for the erasing purpose, it was a problem that it took considerable time for winding work and fitting work. Besides, there was such a problem that a large number of component parts were required.

Also, in the case of a magnetic head such as used for recording and reproducing on a floppy disk, the wire diameter of a coil wound on the coil bobbin is fine (about 30 to 45 μm), so the end of the coil is generally connected to a relay terminal plate which is then connected to a lead wire to an external connection or a printed circuit board. This construction is complicated, requires considerable assembly time, number of components, and possibility for error. Also, since it is necessary to perform the separate steps of coil winding and then coil end assembling, there is the problem that the coil may become broken or damaged during transition from the winding step to the assembling step.

SUMMARY OF THE INVENTION

In view of these problems of the prior art, it is a primary object of the present invention to provide a coil bobbin for a magnetic head in which a bobbin for recording and reproducing purpose and a bobbin for erasing are formed into an integral structure.

It is also an object to provide a magnetic head in which the relay terminal plate for the coil winding is not required.

According to the coil bobbin for a magnetic head of the present invention, a recording and reproducing coil bobbin and an erasing coil bobbin each having a hole made therein for inserting a core are made integral by being coupled at one end portions thereof through a flange with holes for inserting cores made therein.

The coil bobbin has a plurality of terminal pins on the flange to which the recording and reproducing coil and the erasing coil have their ends connected. A flexible printed circuit board having terminal pin insertion holes formed therein is directly connected to the magnetic head by mounting it on the terminal pins of the flange.

Thus, the coil bobbin for a magnetic head of the present invention is provided in an integral structure in which the recording and reproducing coil and the erasing coil are coupled through a flange.

The mounting of the printed circuit board to the terminal pins on the flange eliminates the need for the relay terminal pins on the flange eliminates the need for the relay terminal plate, and the printed circuit board pattern is connected to the coils by the terminal pin insertion holes being mounted over the terminal pins.

DESCRIPTION OF THE PREFERRED EMBODIMENTS

A preferred embodiment of the present invention will be described referring to the accompanying drawings in the following.

Figure 1:
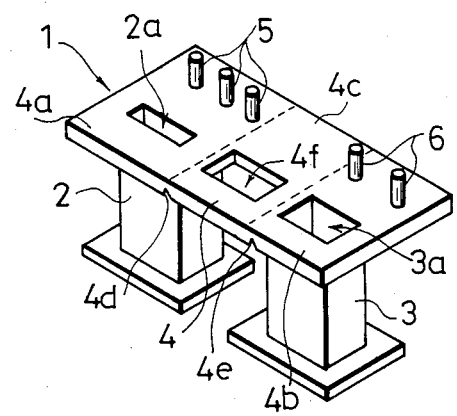
FIG. 1 is a perspective view showing a coil bobbin of a magnetic head describing an embodiment of the present invention.

FIG. 1 is a perspective view showing a coil bobbin according to one embodiment of the present invention. A coil bobbin 1 of a magnetic head of the present embodiment is of an integral structure of a recording and reproducing coil bobbin 2 and an erasing coil bobbin 3 arranged in parallel at a predetermined distance from each other and coupled through an upper flange 4. The coil bobbin 1 is prepared by resin forming of a synthetic resin material having flexibility whereby the recording and reproducing coil bobbin 2, erasing coil bobbin 3, and the flange 4 are made integral.

The flange 4 is formed of a flange segment 4a providing an upper flange portion for the recording and reproducing coil bobbin 2, a flange segment 4b for providing an upper flange portion for the erasing coil bobbin 3, and a connecting plate portion 4c for providing a connection between the two flange segments 4a and 4b, and there are provided notches between the connecting plate portion 4c and both of the flange segments 4a and 4b running on the underside of the flange 4.

The recording and reproducing coil bobbin 2 and erasing coil bobbin 3 are provided with holes 2a and 3a of a square form in section made therein for inserting a core and the connecting plate portion 4c is also provided with a square hole 4f made therein for inserting cores.

The flange 4 is projected in its rear portion longer than in its front portion, and there are three recording and reproducing terminal pins 5 and two erasing terminal pins 6 embedded in the flange 4 passing therethrough along the rear edge portion of the flange segments 4a and 4b, respectively,.

Figure 2:
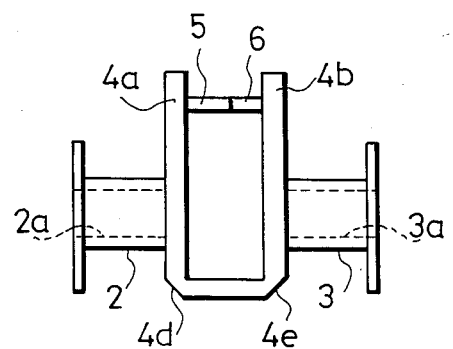
FIG. 2 is a side view showing the coil bobbin of FIG. 1 in a folded state for being subjected to winding work.

In order to wind a recording and reproducing coil 7 and an erasing coil 8 (refer to FIG. 3) around the recording and reproducing coil bobbin 2 and the erasing coil bobbin 3 of the coil bobbin 1 of the present embodiment of the above described structure, at first, as shown in FIG. 2, the flange segments 4a and 4b of the flange 4 are folded at the notches 4d and 4e upward through a right angle so that both the flange segments 4a and 4b may face each other. Since, the holes 2a and 3a for inserting a core then come to the positions in correspondence with each other, a jig for coil winding (not shown) is inserted into these holes for core insertion, and then, a wire is continuously wound around the recording and reproducing coil bobbin 2 and erasing coil bobbin 3, and thereby, the recording and reproducing coil 7 and erasing coil 8 are wound. After the recording and reproducing coil 7 and erasing coil 8 have been wound, the coil bobbin 1 is separated from the jig for coil winding, the recording and reproducing coil 7 and the erasing coil 8 are cut off, and the ends of the wires of these coils, respectively, are connected to the terminal pins 5 and 6 and fixed by soldering or the like.

Figure 3:
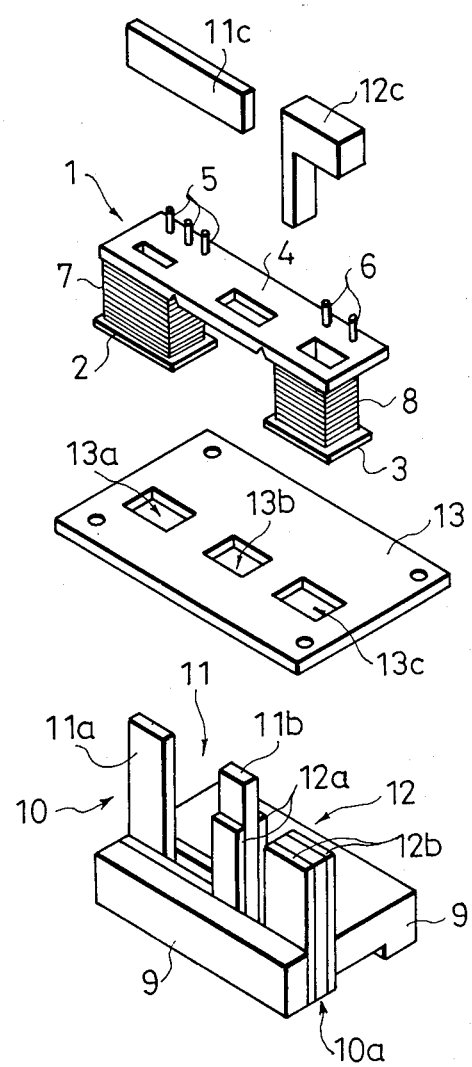
FIG. 3 is an exploded view in perspective of a magnetic head using the coil bobbin as shown in FIG. 1.

In order to assemble a magnetic head with the coil bobbin 1 wound by the recording and reproducing coil 7 and the erasing coil 8 in the above described manner, at first, as shown in FIG. 3, leg portions 11a and 11b of the recording and reproducing core 11 and leg portions 12a and 12b of the erasing core 12—projected in a manner to stand up from the side opposite to the side of a sliding surface (to slide on a record medium) 10a of a core subassembly 10 assembled in a manner to be sandwiched between sliders 9—are inserted into holes for recording and reproducing core 13a and 13b and holes for erasing core 13b and 13c made in a nonmagnetic plate 13 and the plate 13 is allowed to abut on the sliders 9. Thereafter, the hole 2a for inserting a core of the recording and reproducing coil bobbin 2 is put on one leg portion 11a of the recording and reproducing core 11, the hole 4f for inserting cores is put on the other leg portion 11b of the recording and reproducing core 11 and one leg portion 12a of the erasing core 12, and the hole 3a for inserting a core of the erasing coil bobbin 3 is put on the other leg portion 12b of the erasing core 12, respectively, whereby end portions of the leg portions 11a and 11b of the recording and reproducing core 11 and of the leg portions 12a and 12b of the erasing core 12 are allowed to stick out of the flange 4. And then, the leg portions 11a and 11b of the recording and reproducing core 11 sticking out are provided with a connection therebetween by a recording and reproducing back core 11c in a plate form attached thereto and the leg portions 12a and 12b of the erasing core 12 are provided with a connection therebetween by an erasing back core 12c in an L-form, whereby, a closed recording and reproducing magnetic path and a closed erasing magnetic path, respectively, are formed.

Figure 4:
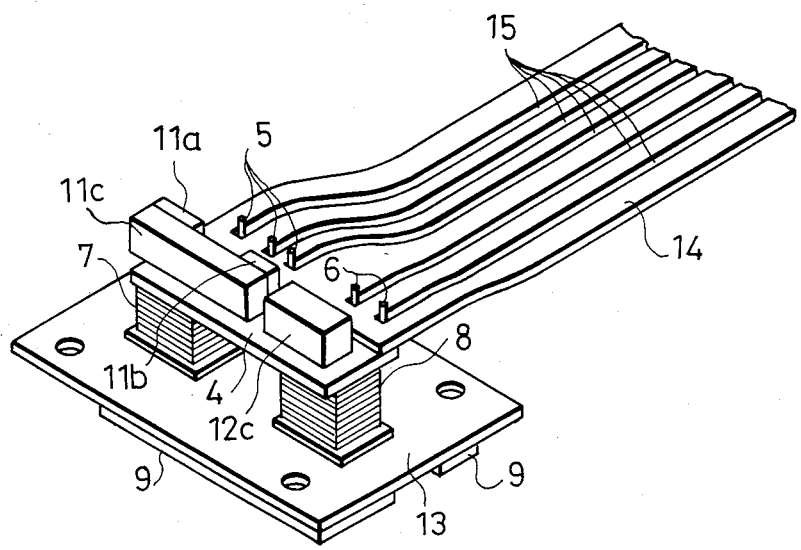
FIG. 4 is a perspective view of the magnetic head of FIG. 3 in an assembled state.

Thereafter, as shown in FIG. 4, holes for inserting terminal pin made in the front end portion of a conductive printed pattern 15 of a flexible printed board 14 are put on their respective recording and reproducing terminal pins 5 and erasing terminal pins 6 and these parts are fixed together by soldering or the like, and thus, the assembly of the magnetic head is completed.

Figure 5:
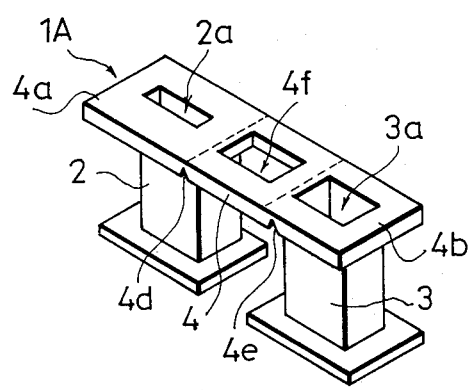
FIG. 5 is a perspective view showing a coil bobbin of a magnetic head according to another embodiment of the present invention.

FIG. 5 is a drawing showing another embodiment of the present invention, a coil bobbin 1A, which is the same as the coil bobbin 1 of FIG. 1, but herein, the recording and reproducing terminal pins 5 and erasing terminal pins 6 in the flange 4 are done away with and the width of the flange 4 is made so much narrower. Since, otherwise, this is the same as the coil bobbin 1 of in FIG. 1, detailed description thereof is omitted here. It is a matter of course that effects like to those obtained from the coil bobbin 1 of FIG. 1 can be obtained from the coil bobbin 1A of the present embodiment.

Incidentally, in the above described embodiments, the flange of the coil bobbin has been provided with notches so that the recording and reproducing coil bobbin and the erasing coil bobbin may be arranged to face each other at one end portions thereof, but as a matter of course, the notches are not necessarily needed.

According to the present invention as described above, since the recording and reproducing coil bobbin and the erasing coil bobbin have been made integral by being coupled through the flange, such effects have been produced that the number of the component parts can be reduced and the fitting work can be finished in a shorter time.

Further, since the flange has been formed of a flexible synthetic resin material integrally with the recording and reproducing coil bobbin and the erasing coil bobbin, coil winding for both the recording and reproducing coil and the erasing coil can be performed at a time, and therefore, an effect has been obtained that the coiling work can be carried out easily.

Furthermore, by the provision of the terminal pins in the flange, an effect is obtained that the magnetic head can be simply and surely connected with lead wires for external connections or with a flexible printed board.

The terminal pins are inserted in the insertion holes at the extremity ends of the printed circuit patterns on the board, whereby the relay terminal plate is eliminated, the number of component parts is reduced, and the wiring can be easily and positively carried out in a short period of time. Since the ends of the coils are connected to the pins at the end of the coil winding step, the coil is not liable to being damaged or broken between the winding step and the subsequent assembling step.

What is claimed is:

1. A magnetic head having a recording and reproducing core, an erasing core, a coil for recording and reproducing, and a coil for erasing on a magnetic medium with which the magnetic head is placed in moving contact, and a structure for holding said cores and coils comprising:

a bobbin member having a recording and reproducing coil bobbin and an erasing coil bobbin arranged in parallel in an upright direction and spaced apart from each other along a lateral direction, each having a hole therethrough for insertion of a corresponding one of said magnetic cores, and having a respective one of said coils wound therearound, wherein the respective magnetic cores inserted through said holes in said bobbin form a magnetic head at one end of said bobbin member along the upright direction;

a flange formed at another end of said bobbin member opposite from said one end forming said magnetic head;

a plurality of terminal pins for each of the coils wound on the bobbins arranged on said flange, said pins extending in parallel with each other in an upright direction perpendicular to said flange, wherein the ends of the coils wound on said coil bobbins are connected to respective ones of said terminal pins; and a flexible printed circuit board having terminal pin insertion holes arranged in a corresponding row at one end thereof parallel to said lateral direction, through which the terminal pins are inserted, and by which conductive patterns on said printed circuit board are directly physically and electrically connected to the terminal pins, wherein said printed circuit board being directly connected to said terminal pins can be flexed and follows movement of the magnetic head in moving contact with the magnetic medium and the need for any connecting wires between said terminal pins and said printed circuit board and the risk of breakage thereof can be avoided.

2. A magnetic head according to claim 4, wherein said flange is formed of a flexible synthetic resin integrally with said recording and reproducing coil bobbin and said erasing coil bobbin, and wherein said flange is provided with notches so that said recording and reproducing coil bobbin and said erasing coil bobbin are enabled to face each other at one end portions thereof.

3. A magnetic head according to claim 1 wherein said flange is provided with recording and reproducing terminal pins and erasing terminal pins embedded therein.

* * * * *

UNITED STATES PATENT AND TRADEMARK OFFICE
CERTIFICATE OF CORRECTION

PATENT NO. : 4,788,613

DATED : November 29, 1988

INVENTOR(S) : Yamashita

It is certified that error appears in the above-identified patent and that said Letters Patent is hereby corrected as shown below:

Col. 5, line 5, delete "4" and insert --1--.

Signed and Sealed this

Fifteenth Day of August, 1989

Attest:

DONALD J. QUIGG

Attesting Officer

Commissioner of Patents and Trademarks